United States Patent
Liu et al.

(10) Patent No.: US 11,719,595 B2
(45) Date of Patent: Aug. 8, 2023

(54) TESTING DEVICE AND TESTING SYSTEM FOR HIGH-PRESSURE AND LARGE-SCALE GAP DYNAMIC SEALING PERFORMANCE

(71) Applicant: HUAZHONG UNIVERSITY OF SCIENCE AND TECHNOLOGY, Hubei (CN)

(72) Inventors: Yinshui Liu, Hubei (CN); Shendan Zhao, Hubei (CN); Defa Wu, Hubei (CN); Hao Pang, Hubei (CN); Yipan Deng, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 19 days.

(21) Appl. No.: 17/537,448

(22) Filed: Nov. 29, 2021

(65) Prior Publication Data
US 2022/0170811 A1    Jun. 2, 2022

(30) Foreign Application Priority Data
Nov. 30, 2020 (CN) .......................... 202011366612.4

(51) Int. Cl.
*G01M 3/28* (2006.01)
*G01M 3/26* (2006.01)
*F04B 51/00* (2006.01)

(52) U.S. Cl.
CPC ............... *G01M 3/26* (2013.01); *F04B 51/00* (2013.01)

(58) Field of Classification Search
CPC ...... G01M 3/00; G01M 3/26–28; F01B 51/00
See application file for complete search history.

(56) References Cited

FOREIGN PATENT DOCUMENTS

| CN | 104236817 B | * | 8/2016 | ............... F04B 51/00 |
| CN | 110905797 B | * | 7/2022 | ............... F04B 51/00 |

* cited by examiner

*Primary Examiner* — Nguyen Q. Ha
(74) *Attorney, Agent, or Firm* — JCIPRNET

(57) ABSTRACT

The disclosure discloses a testing device and a testing system for testing high-pressure and large-scale gap dynamic sealing performance of a plunger sleeve. The testing device includes two cylinders, first and second plunger rods and a piston rod. A first chamber is formed between an end of the first plunger rod and a first cylinder, and a second chamber is formed between an end of the second plunger rod and a second cylinder. The first chamber and the second chamber are provided with high-pressure liquid, and the two chambers communicate with each other. When being driven by a driving device, the piston rod drives the first and second plunger rods to reciprocate left and right. The plunger sleeve and a locking plunger sleeve are disposed outside each of the first and second plunger rods. The locking plunger sleeve has a leakage port. When the first and second plunger rods reciprocate, the high-pressure liquid in the chambers leaks from the leakage port.

7 Claims, 3 Drawing Sheets

TESTING DEVICE AND TESTING SYSTEM FOR HIGH-PRESSURE AND LARGE-SCALE GAP DYNAMIC SEALING PERFORMANCE

CROSS-REFERENCE TO RELATED APPLICATION

This application claims the priority benefit of China application serial no. 202011366612.4, filed on Nov. 30, 2020. The entirety of the above-mentioned patent application is hereby incorporated by reference herein and made a part of this specification.

BACKGROUND

Technical Field

The disclosure belongs to the technical field related to sealing technology, and in particular, relates to a testing device and a testing system for high-pressure and large-scale gap dynamic sealing performance.

Description of Related Art

In recent years, with the advancement of science and technology, in the field of sealing, the study of gap sealing has attracted increasing attention. Gap sealing is non-contact sealing that combines circumferential slit sealing and axial end surface sealing. Gap sealing relies on the tiny gap between the relative moving parts to inhibit leakage and to achieve sealing, and is the simplest form of sealing. The performance of gap sealing depends on factors such as gap size, sealing length, surface quality of parts, pressure difference, fluid viscosity and so on.

At present, most of the high-pressure and large-flow reciprocating plunger pumps use soft sealing materials made of rubber or engineering plastics. Regarding contact sealing, due to the close contact between the plunger and the seal, considerable friction may be generated, resulting in serious heat generation of the seal and causing damage to the seal, so the seal has to be frequently replaced as a result. With the development of high-pressure and large-scale plunger pumps, the pv value of the friction pair may easily exceed the capacity limit of the soft seal packing, resulting in a low seal life. The life of foreign-produced seals for high-pressure and large-flow reciprocating plunger pumps for mining is generally 1 to 3 months only, and the life of some domestic seals is even 3 to 10 days only. Compared with conventional contact sealing, gap sealing exhibits the advantages of low friction coefficient, low heat generation, and long life, which makes the gap sealing be equipped with outstanding advantages in the field of high-speed dynamic sealing. Gap sealing is widely used in small-scale plunger pumps. For large-sized plungers, the disadvantages such as large leakage of the plunger pair and high costs of the pairing of the plungers have become the main factors inhibiting the large-flow and high-pressure development of gap sealing. Therefore, it is necessary to study the flowing characteristics and leakage mechanism of large-scale gap dynamic sealing.

SUMMARY

Regarding the abovementioned defects or the requirement for improvement, the disclosure provides a testing device and a testing system for high-pressure and large-scale gap dynamic sealing performance. By a first chamber and a second chamber communicating left and right with each other, pressure of high-pressure liquid received by a piston in a horizontal direction is counteracted, and the piston is driven by a hydraulic driving device, such that reciprocating movement of a reciprocating radial plunger pump is simulated on the one hand, low-power driving of the piston is achieved on the other hand, and measurement of liquid leakage is thereby implemented.

To achieve the above, the disclosure provides a testing device for testing high-pressure and large-scale gap dynamic sealing performance of a plunger sleeve. The testing device includes two cylinders, a first plunger rod, a second plunger rod, and a piston rod.

The first plunger rod and the second plunger rod are symmetrically distributed on both sides of the piston rod. The left plunger rod and the right plunger rod are symmetrically disposed on both sides of the piston rod. A first chamber is formed between an end of the first plunger rod and a first cylinder, and a second chamber is formed between an end of the second plunger rod and a second cylinder. High-pressure liquid is provided in the first chamber and the second chamber. The first chamber communicates with the second chamber through a circulation pipe.

The piston rod is connected to the first plunger rod and the second plunger rod. When being driven by a driving device, the piston rod drives the first plunger rod and the second plunger rod to reciprocate. The plunger sleeve and a locking plunger sleeve are disposed outside each of the first plunger rod and the second plunger rod. The locking plunger sleeve is provided with a leakage port. When the first plunger rod and the second plunger rod reciprocate, the high-pressure liquid in the first chamber and the second chamber flows into the leakage port respectively through a gap between the first plunger rod and the plunger sleeve and through a gap between the second plunger rod and the plunger sleeve. An amount of the high-pressure liquid leaking from the leakage port is measured, such that testing of the sealing performance of the plunger sleeve is implemented.

In a preferred embodiment of the disclosure, central axes of the first plunger rod, the piston rod, the second plunger rod, the first chamber and the second chamber are on a same horizontal line, such that a force exerted by the high-pressure liquid in the first chamber on the first plunger rod is equal to a force exerted by the high-pressure liquid in the second chamber on the second plunger rod.

In a preferred embodiment of the disclosure, each of the first plunger rod and the second plunger rod is provided with a displacement sensor configured to measure actual reciprocating displacement of the first plunger rod and the second plunger rod to simulate an actual movement stroke of a reciprocating radial plunger pump.

In a preferred embodiment of the disclosure, the high-pressure liquid leaking from the leakage port is measured by a flow meter.

In a preferred embodiment of the disclosure, a front end of the leakage port is further provided with a Turcon Stepseal configured to block the high-pressure liquid and make the high-pressure liquid flow back into the leakage port.

In a preferred embodiment of the disclosure, a pressure range in the high-pressure liquid is: ≥40 MPa, and a diameter of a plunger is ≥80 mm.

In a preferred embodiment of the disclosure, the testing system includes a hydraulic driving device and a water-pressure driving device. The hydraulic driving device is configured to drive the piston rod to reciprocate left and right. The water-pressure driving device provides high-pressure liquid in the first chamber and the second chamber to compensate for the leaked high-pressure liquid.

In general, the above technical solutions provided by the disclosure have the following beneficial effects compared with the related art.

1. In the device configured to test high-pressure and high-speed reciprocating large plunger gap sealing performance provided by the disclosure, through two pairs of plungers on the same axis and symmetrical to each other and two plunger chambers that can communicate with each other, the hydraulic pressure generated by the liquid on the plungers may be counteracted by the axis. The reciprocating movement of the plungers under the action of high-pressure fluid needs to overcome great hydraulic pressure, so considerable power is required to drive such movement. However, in the disclosure, the reciprocating movement of the plungers only needs to overcome its own inertial force and friction force to move and does not need to overcome the hydraulic pressure, thus low-power driving may be realized.

2. In the disclosure, a hydraulic cylinder coaxial with each plunger is used to drive the plunger to reciprocate. Compared with a conventional crank linkage rod mechanism, in the disclosure, no lateral force is generated, the hydraulic pressure on both sides of the plunger is almost completely eliminated, and the driving power is reduced to the greatest extent. Through the use of the proportional servo valve and the variable frequency motor, the flow and pressure of the servo cylinder may be controlled, such that the reciprocating frequency and movement range of the hydraulic rod may be accurately controlled, and operation of the reciprocating radial plunger pump under multiple working conditions may also be simulated.

3. In the disclosure, the large-diameter through-flow pipeline communicates with the left and right cylinders to form the fluid area. This fluid area is not only used to compensate for pressure fluctuations caused by the reciprocation of the plungers, but also to balance the fluid pressure of the left and right cylinders.

4. In the disclosure, the displacement and speed of the piston rod may be accurately controlled through the proportional servo valve and the displacement sensors, thereby driving the plungers to reciprocate. Further, by adjusting the reciprocating speed of the plunger, the stroke, the sealing pressure, the size of the sealing gap, the length of the sealing contact and other parameters, the operation of the large-flow plunger pump is simulated under multiple working conditions. The flow meter is used to test the corresponding leakage under different sealing lengths, and the dynamic sealing performance of the plunger may therefore be accurately evaluated.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

Figure 1:
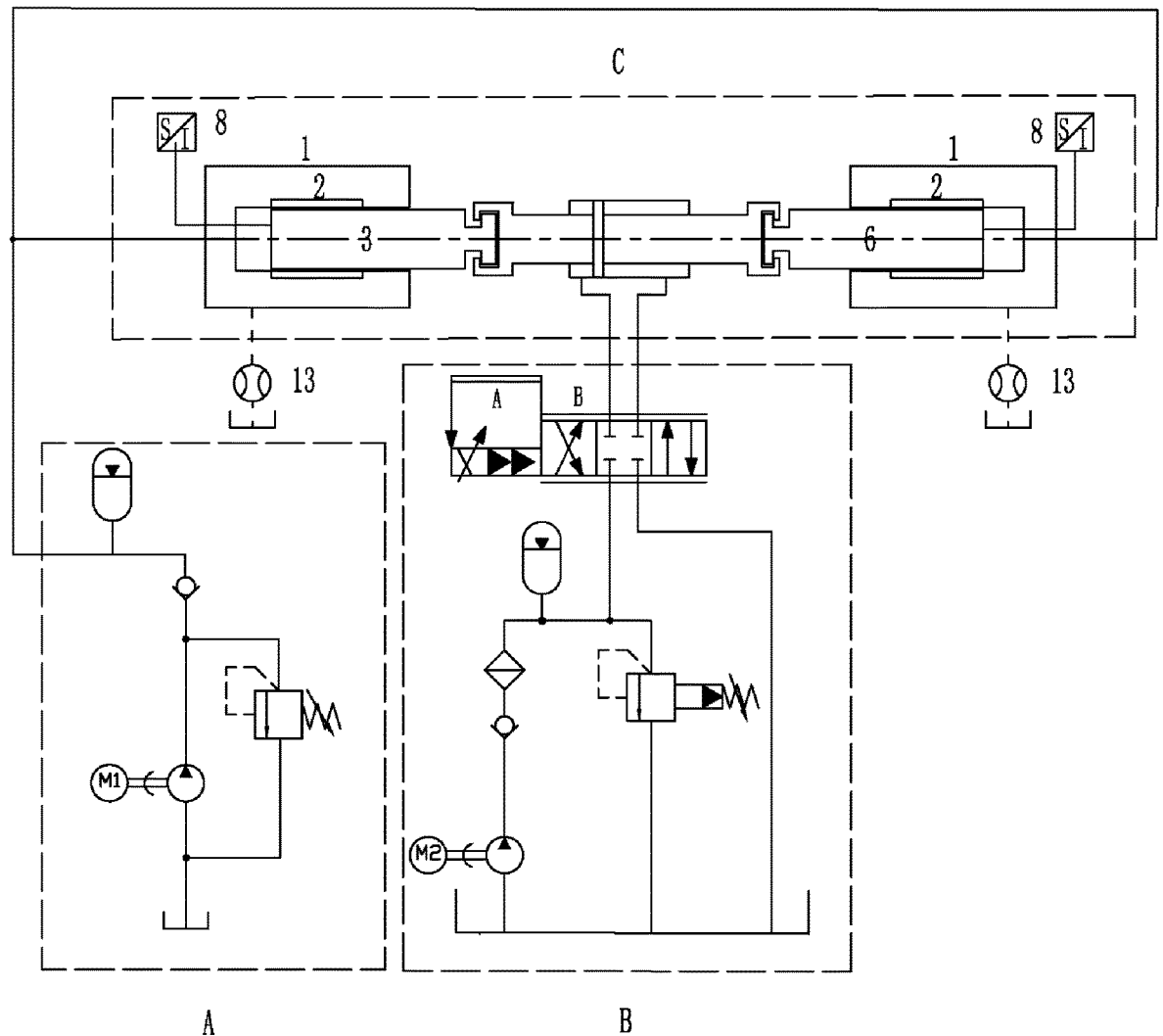
FIG. 1 is a schematic diagram of a structure of a testing device for sealing performance according to a preferred embodiment of the disclosure.

FIG. 1 is a schematic diagram of a testing system for sealing performance according to a preferred embodiment of the disclosure. The testing system includes a water-pressure system A, a hydraulic system B, a flow testing device C, two cylinders 1, two displacement sensors 8, two plunger sleeves 2, a first plunger rod 3, a second plunger rod 6 and two flow meters 13, and so on.

Figure 2:
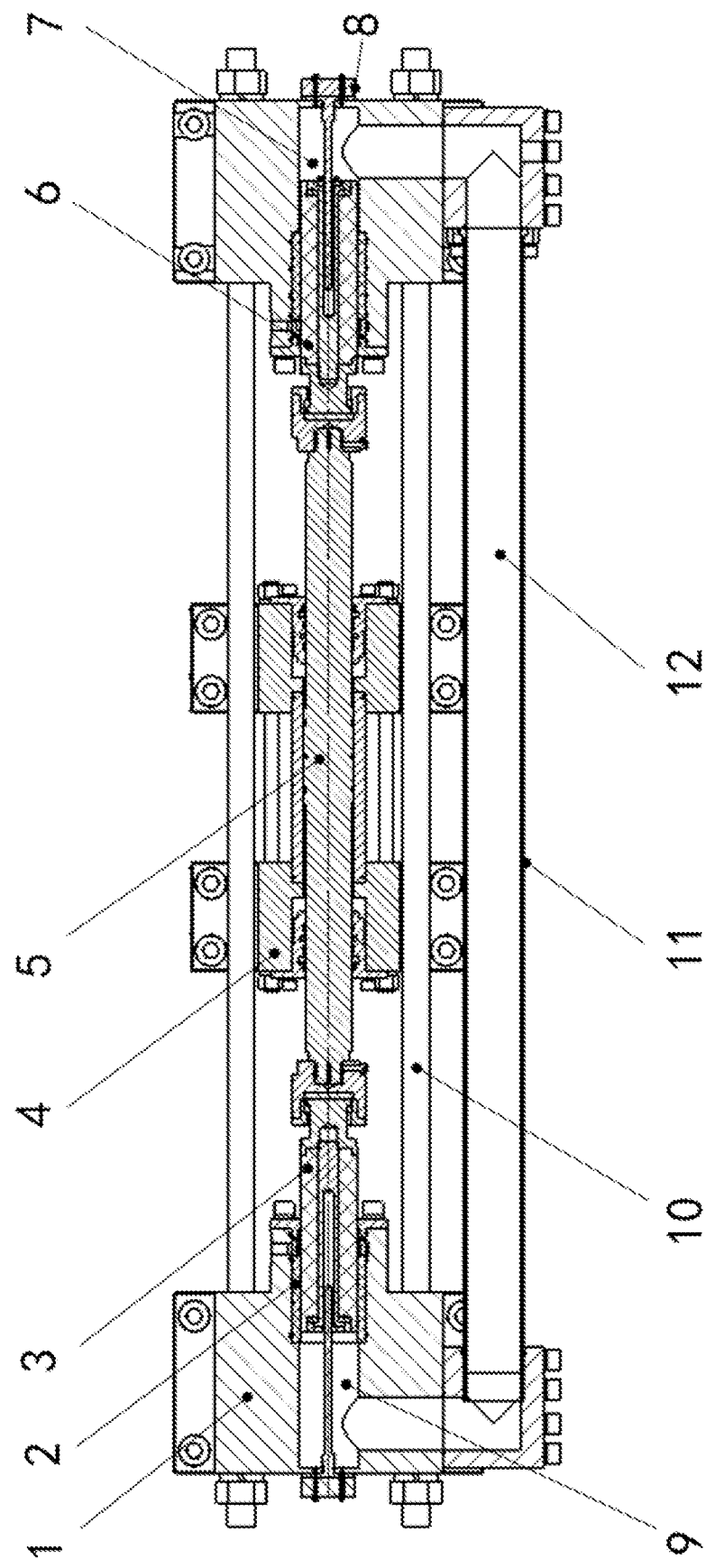
FIG. 2 is a cross-sectional view of an overall structure of a flow testing device according to a preferred embodiment of the disclosure.

A working principle of a testing system for sealing performance is described in detail in combination with FIG. 1, FIG. 2, and the embodiments. A hydraulic circuit provided by the disclosure includes a water circuit and an oil circuit. The water-pressure system A in FIG. 1 includes a water tank, a motor, a water pump, an overflow valve, a one-way valve, and an accumulator, and so on. The water-pressure system includes various components in the water circuit and provides high-pressure liquid for the flow testing device C, and the high-pressure liquid is used to compensate for the leakage of gap sealing in a high-pressure environment. Each circuit in the dashed frames of the hydraulic system B in FIG. 1 is an oil circuit. In the circuit, an oil pump outputs the oil, which is adjusted to the required pressure by the overflow valve. Further, through control of reciprocating movement of a plunger driven by a hydraulic cylinder by a proportional servo valve, a reciprocating frequency and movement range of the plunger are accurately controlled, and a speed and acceleration of the plunger under various working conditions may be simulated. The flow testing device C in FIG. 1 includes the cylinders 1, the plunger sleeves 2, the displacement sensors 8, the first plunger rod 3, the second plunger rod 6, the flow meters 13 and other components, and a specific structure thereof is shown in FIG. 2.

FIG. 2 is a cross-sectional view of an overall structure of a flow testing device according to a preferred embodiment of the disclosure. The flow testing device includes cylinders 1, plunger sleeves 2, the first plunger rod 3, the second plunger rod 6, displacement sensors 8, a hydraulic cylinder 4, a piston rod 5, four double-ended studs 10, a through-flow pipeline 11, and a fluid area 12. Two sets of plunger pairs respectively formed by the first and second plunger rods 3 and 6 and the plunger sleeves 2 share the same structure, which is specifically shown in FIG. 3.

The piston rod 5 is connected to the first plunger rod 3 by screw fastening, and the structures are all on a same axis. When the device works, a first chamber 9 and a second chamber 7 are communicated through the through-flow pipeline 11, and the liquid in the formed fluid area 12 may circulate. In this way, the resistance of the fluid received by the plunger when reciprocating is considerably reduced. Besides, since the four double-ended studs 10 are connected to the cylinder 1, the axial hydraulic pressure is thereby counteracted, and it is ensured that the structure may not be excessively deformed. Each cylinder 1 is equipped with the displacement sensor 8 for monitoring and feedback of the displacement of the plunger. The hydraulic cylinder 4 connected to the hydraulic system is disposed in the middle of the device. The reciprocating movement of the piston rod and the plunger is performed by the hydraulic pressure in the hydraulic cylinder 4, and the reciprocating frequency and movement range are accurately controlled by the proportional servo valve.

Figure 3:
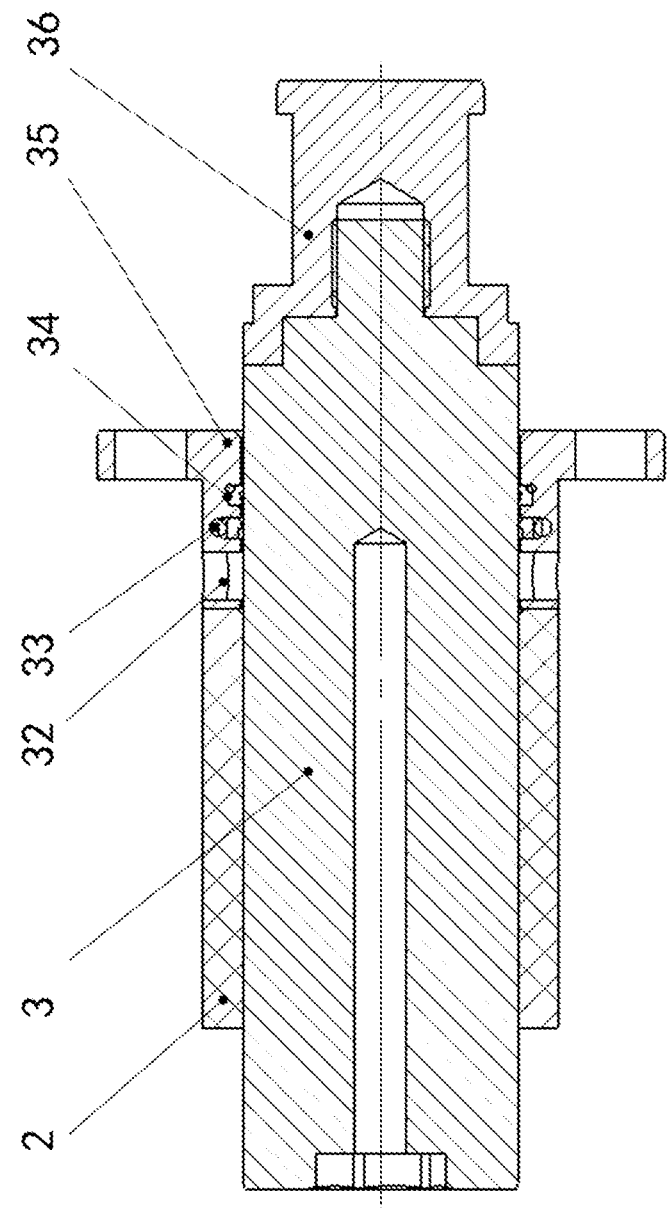
FIG. 3 is a schematic diagram of a plunger pair structure of a first plunger rod according to a preferred embodiment of the disclosure.

FIG. 3 is a schematic diagram of a plunger pair structure of the first plunger rod 3. In the figure, one set of plunger pair includes one plunger sleeve 2, the first plunger rod 3, one leakage port 32, one Turcon Stepseal 33, one dust-proof ring 34, one locking plunger sleeve 35, and one plunger protection head 36. In the figure, the locking plunger sleeve 35 is provided with two grooves for installation of the Turcon Stepseal 33 and the dust-proof ring 34, and the locking plunger sleeve 35 is also provided with the leakage port 32. The flow leaked by gap sealing may flow to the Turcon Stepseal 33 to cool the plunger sleeve 2 and the Turcon Stepseal 33, such that the plunger sleeve 2 is prevented from being thermally deformed and the Turcon Stepseal 33 is prevented from being overheated and failing. The leaked fluid may also be blocked by the Turcon Stepseal 33 and then entirely flows into the leakage port 32, and the fluid may enter the flow meter to be measured. Moreover, the plunger protection head 36 is threadedly connected to the first plunger rod 3 through a thread, and the first plunger rod 3 is thereby protected. The plunger pair of the second plunger rod shares the same structure as the plunger pair of the first plunger rod.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A testing device for testing high-pressure and large-scale gap dynamic sealing performance of a plunger sleeve, the testing device comprising two cylinders, a first plunger rod, a second plunger rod and a piston rod, wherein
the first plunger rod and the second plunger rod are symmetrically distributed on both sides of the piston rod, a first chamber is formed between an end of the first plunger rod and a first cylinder, a second chamber is formed between an end of the second plunger rod and a second cylinder, high-pressure liquid is provided in the first chamber and the second chamber, and the first chamber communicates with the second chamber through a through-flow pipeline,
the piston rod is connected to the first plunger rod and the second plunger rod, the piston rod drives the first plunger rod and the second plunger rod to reciprocate when being driven by a driving device,
the plunger sleeve and a locking plunger sleeve are disposed outside each of the first plunger rod and the second plunger rod, the locking plunger sleeve is provided with a leakage port, and
when the first plunger rod and the second plunger rod reciprocate, the high-pressure liquid in the first chamber and the second chamber flows into the leakage port respectively through a gap between the first plunger rod and the plunger sleeve and through a gap between the second plunger rod and the plunger sleeve, and an amount of the high-pressure liquid leaking from the leakage port is measured to test sealing performance of the plunger sleeve.

2. The testing device according to claim 1, wherein central axes of the first plunger rod, the piston rod, the second plunger rod, the first chamber and the second chamber are on a same horizontal line, such that a force exerted by the high-pressure liquid in the first chamber on the first plunger rod is equal to a force exerted by the high-pressure liquid in the second chamber on the second plunger rod.

3. The testing device according to claim 1, wherein each of the first plunger rod and the second plunger rod is provided with a displacement sensor configured to measure actual reciprocating displacement of the first plunger rod and the second plunger rod to simulate an actual movement stroke of a reciprocating radial plunger pump.

4. The testing device according to claim 1, wherein the high-pressure liquid leaking from the leakage port is measured by a flow meter.

5. The testing device according to claim 1, wherein a front end of the leakage port is further provided with a Turcon Stepseal configured to block the high-pressure liquid and make the high-pressure liquid flow back into the leakage port.

6. The testing device according to claim 1, wherein a pressure range in the high-pressure liquid is $\geq 40$ MPa, and a diameter of a plunger is $\geq 80$ mm.

7. A testing system, applying the testing device according to claim 1, the testing system comprising a hydraulic driving device and a water-pressure driving device, wherein the hydraulic driving device is configured to drive the piston rod to reciprocate left and right, and the water-pressure driving device provides high-pressure liquid in the first chamber and the second chamber to compensate for the leaked high-pressure liquid.

* * * * *